(12) United States Patent
Engi et al.

(10) Patent No.: US 11,595,283 B2
(45) Date of Patent: Feb. 28, 2023

(54) MESSAGE BUS SUBSCRIPTION MANAGEMENT WITH TELEMETRY INFORM MESSAGE

(71) Applicant: Cisco Technology, Inc., San Jose, CA (US)

(72) Inventors: Derek Engi, Ferndale, MI (US); Jorge Martin Garcia Rangel, Chula Vista, CA (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/385,457

(22) Filed: Jul. 26, 2021

(65) Prior Publication Data
US 2023/0025233 A1    Jan. 26, 2023

(51) Int. Cl.
| G06F 15/173 | (2006.01) |
| H04L 43/0823 | (2022.01) |
| H04L 43/04 | (2022.01) |
| H04L 9/40 | (2022.01) |
| H04L 43/065 | (2022.01) |

(52) U.S. Cl.
CPC .......... *H04L 43/0823* (2013.01); *H04L 43/04* (2013.01); *H04L 43/065* (2013.01); *H04L 63/1425* (2013.01)

(58) Field of Classification Search
CPC ... H04L 43/0823; H04L 43/04; H04L 43/065; H04L 63/1425
See application file for complete search history.

(56) References Cited

U.S. PATENT DOCUMENTS

| 9,654,503 | B1* | 5/2017 | Kowalyshyn | ....... H04L 63/1425 |
| 9,893,952 | B2 | 2/2018 | Wu et al. | |
| 10,268,524 | B2 | 4/2019 | Sainaney | |
| 10,966,005 | B2 | 3/2021 | Sadasivarao et al. | |
| 2012/0215856 | A1* | 8/2012 | Beardsmore | .......... H04L 51/226 |
| | | | | 709/206 |
| 2015/0269050 | A1* | 9/2015 | Filimonov | ............. G06N 20/10 |
| | | | | 702/183 |
| 2017/0250855 | A1* | 8/2017 | Patil | ...................... H04L 47/827 |
| 2018/0020015 | A1* | 1/2018 | Munro | .................. G06F 21/552 |
| 2018/0262585 | A1* | 9/2018 | Zandi | ..................... H04L 45/02 |

(Continued)

OTHER PUBLICATIONS

Thiel, Eric, "Gather Network Telemetry Information", online: https://developer.cisco.com/network-automation/detail/1272247236749188/, accessed Jul. 2, 2021, 3 pages.

(Continued)

*Primary Examiner* — Johnny B Aguiar
(74) *Attorney, Agent, or Firm* — Behmke Innovation Group LLC; Kenneth J. Heywood; Jonathon P. Western

(57) ABSTRACT

In one embodiment, a device maintains a buffer of historical telemetry data of a particular type of telemetry. The device obtains new telemetry data of the particular type of telemetry. The device makes a state evaluation by comparing the new telemetry data to the buffer, to determine whether the new telemetry data is an outlier. The device sends a message indicative of the new telemetry data to a message bus for delivery to a recipient that is not subscribed to receive telemetry data of the particular type of telemetry, when the device determines that the new telemetry data is an outlier.

16 Claims, 8 Drawing Sheets

(56) References Cited

U.S. PATENT DOCUMENTS

2020/0162315 A1    5/2020   Siddiqi et al.
2021/0064242 A1*   3/2021   Lee .......................... G06F 3/061
2021/0203576 A1*   7/2021   Padfield ................. H04L 41/16
2021/0321278 A1*   10/2021  Zeng ....................... H04L 63/20

OTHER PUBLICATIONS

Michel, Oliver, "Packet-Level Network Telemetry and Analytics", Dissertation, Computer Science, Jul. 2019, 133 pages, University of Colorado Boulder.

Marques, et al., "An Optimization-Based Approach for Efficient Network Monitoring Using In-Band Network Telemetry", Journal of Internet Services and Applications, 10(12), Jun. 2019, 20 pages, SpringerOpen.

* cited by examiner

US 11,595,283 B2

MESSAGE BUS SUBSCRIPTION MANAGEMENT WITH TELEMETRY INFORM MESSAGE

TECHNICAL FIELD

The present disclosure relates generally to computer networks, and, more particularly, to transparent security and policy enforcement for low-code orchestration.

BACKGROUND

Streaming telemetry can provide valuable information and real-time data to alleviate problems and facilitate analytics-based decisions. For instance, streaming telemetry can be used for purposes of automatic control, such as by However, streaming telemetry also creates a large amount of data generated from devices with these new insights and capabilities. While helpful on one front, this advancement can also impact capacity and throughput to downstream data consumers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
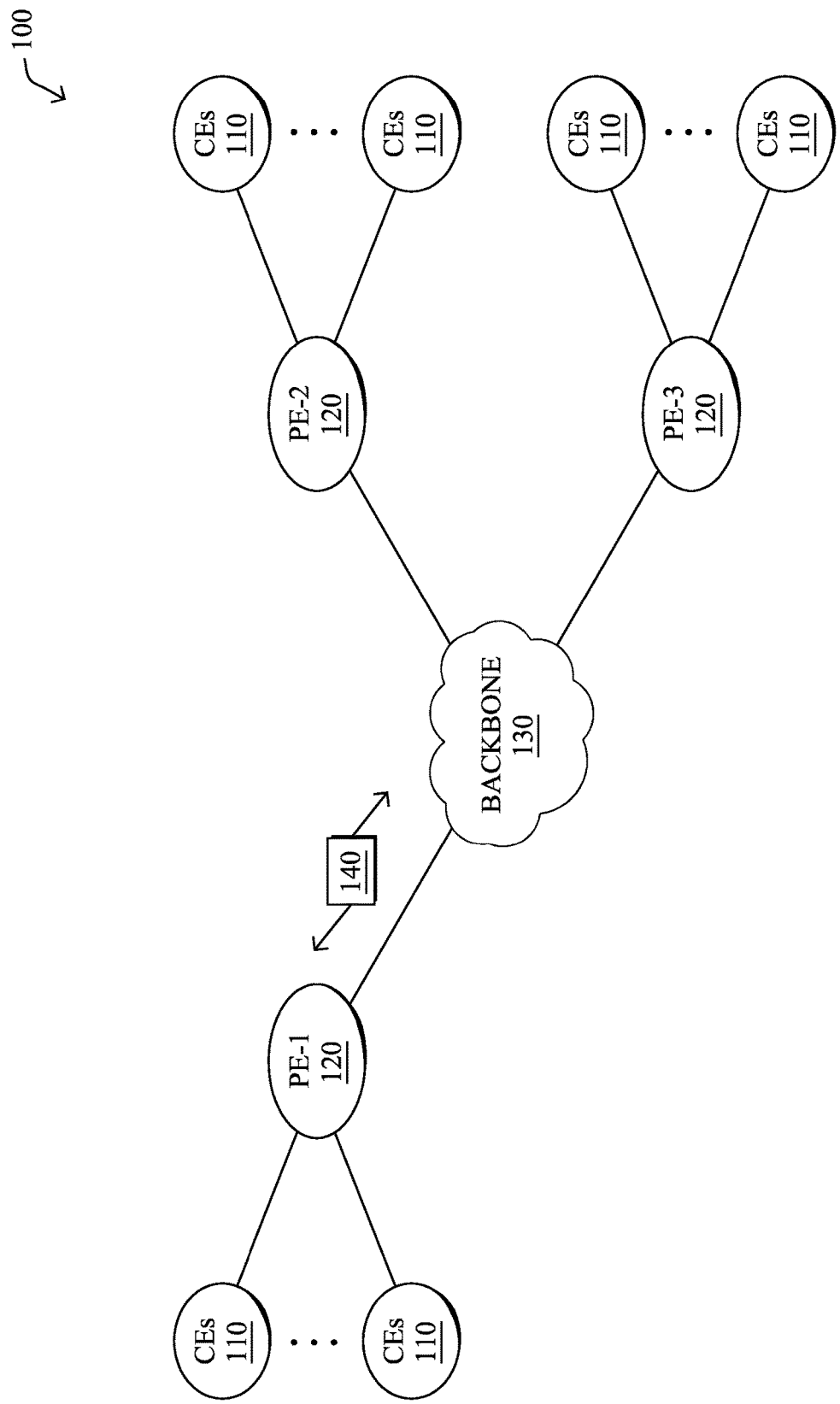
FIGS. 1A-1B illustrate an example computer network.

According to one or more embodiments of the disclosure, a device maintains a buffer of historical telemetry data of a particular type of telemetry. The device obtains new telemetry data of the particular type of telemetry. The device makes a state evaluation by comparing the new telemetry data to the buffer, to determine whether the new telemetry data is an outlier. The device sends a message indicative of the new telemetry data to a message bus for delivery to a recipient that is not subscribed to receive telemetry data of the particular type of telemetry, when the device determines that the new telemetry data is an outlier.

DESCRIPTION

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as Institute of Electrical and Electronics Engineers (IEEE) 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a "third generation" (3G)/Application "fourth generation" (4G)/"fifth generation" (5G)/"long-term evolution" (LTE) backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) using a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
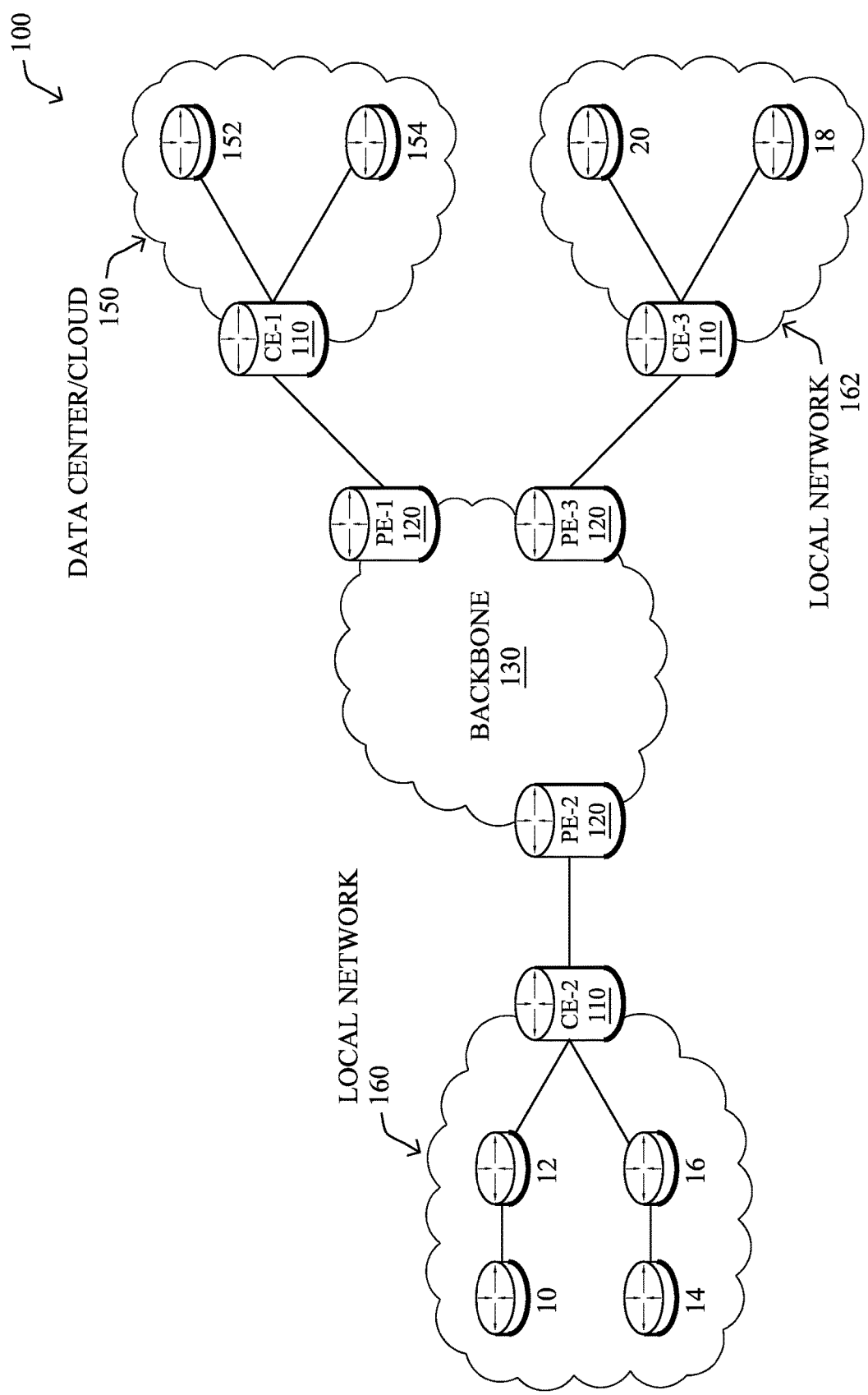

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include nodes/devices 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
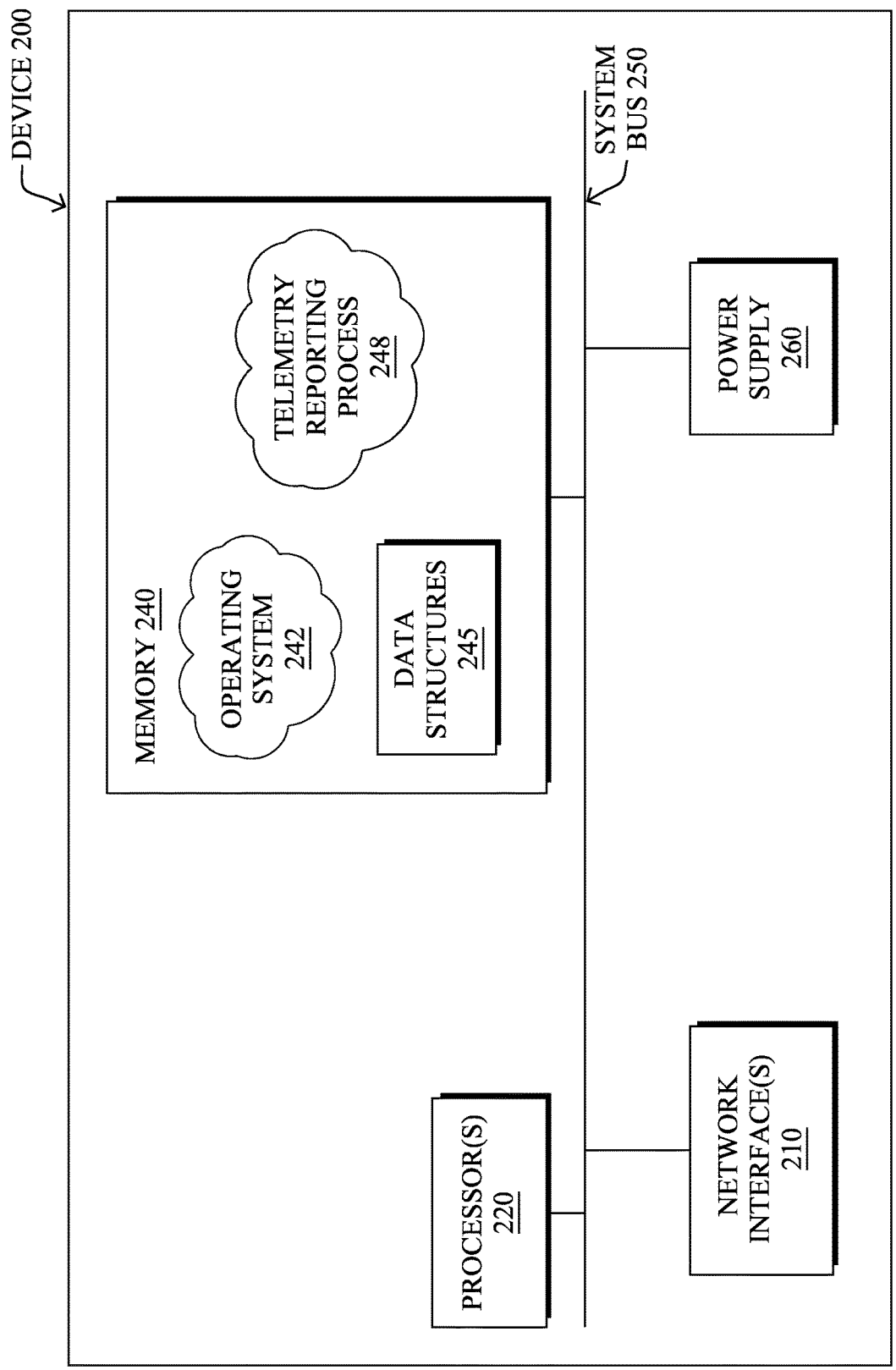
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/devices 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a telemetry reporting process 248 for a low-code development environment, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Telemetry reporting process 248 includes computer executable instructions that, when executed by processor(s) 220, cause device 200 to assess and report telemetry data, either collected locally or by another device in communication with device 200. In various embodiments, telemetry reporting process 248 may utilize machine learning techniques, in whole or in part, to perform its analysis and reasoning functions. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, telemetry reporting process 248 may employ one or more supervised, unsupervised, or self-supervised machine learning models. Generally, supervised learning entails the use of a training large set of data, as noted above, that is used to train the model to apply labels to the input data. For example, the training data may include telemetry data that has been labeled as 'interesting' or 'uninteresting.' On the other end of the spectrum are unsupervised techniques that do not require a training set of labels. Notably, while a supervised learning model may look for previously seen patterns that have been labeled as such, an unsupervised model may instead look to whether there are sudden changes in the behavior. For instance, such an unsupervised model may detect when a particular telemetry data value, or a set of such values, are outliers from a greater body of measurements. Self-supervised is a representation learning approach that eliminates the pre-requisite requiring humans to label data. Self-supervised learning systems extract and use the naturally available relevant context and embedded metadata as supervisory signals. Self-supervised learning models take a middle ground approach: it is different from unsupervised learning as systems do not learn the inherent structure of data, and it is different from supervised learning as systems learn entirely without using explicitly-provided labels.

Example machine learning techniques that telemetry reporting process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, telemetry reporting process 248 may employ deep learning, in some embodiments. Generally, deep learning is a subset of machine learning that employs ANNs with multiple layers, with a given layer extracting features or transforming the outputs of the prior layer.

Figure 3:
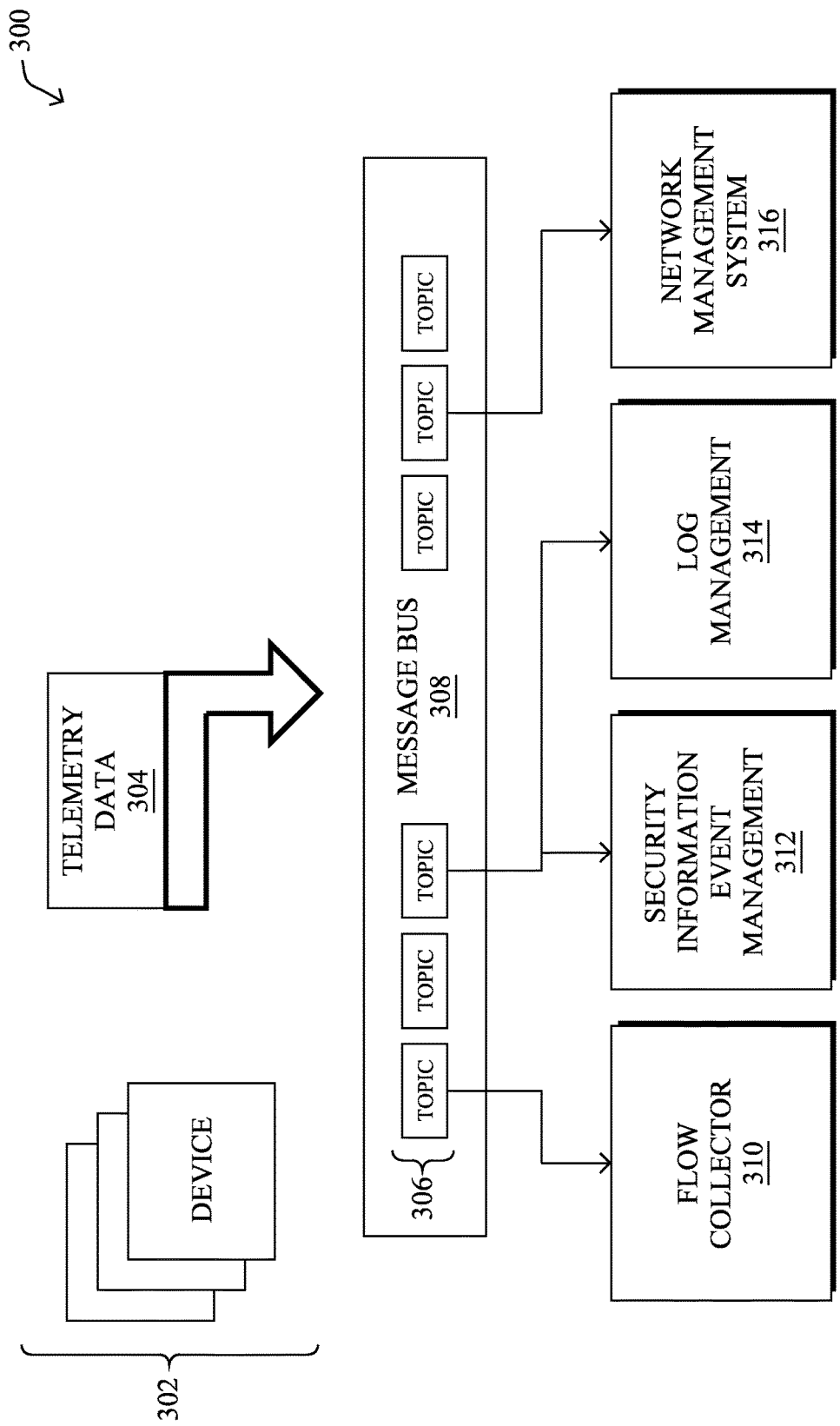
FIG. 3 illustrates an example architecture for a telemetry message bus.

FIG. 3 illustrates an example architecture 300 for a telemetry message bus, according to various embodiments. As shown, there may be any number of devices 302 (e.g., routers, switches, sensors, etc.) that generate and stream telemetry data 304 to a message bus 308. As information is received by message bus 308, it may split telemetry data 304 into topics 306, based on their associated telemetry types. For instance, one topic 306 may correspond to a first counter value of an interface of a particular device 302, another topic 306 may correspond to another counter value from a different device 302, etc.

There may be any number of recipients for stream telemetry data 304 to which message bus 308 sends telemetry data 304. For instance, message bus 308 may send telemetry data 304 to a flow collector 310, a security information event management service 312, a log management service 314, a network management system (NMS) 316, or the like.

Typically, message bus 308 may push telemetry data 304 to any or all of the recipients 310-316, based on the specific topics 306 to which they are subscribed. For instance, flow collector 310 may subscribe to receive telemetry data 304 associated with a first topic, security information event management service 312 and log management service 314 may subscribe to receive telemetry data 304 associated with a second topic, NMS 316 may subscribe to receive telemetry data 304 associated with a third topic, etc.

As noted above, while architecture 300 may be helpful on one front from an analytics standpoint (e.g., the more telemetry data 304 streamed to recipients 312-316, the better), streaming telemetry can also impinge on the operations of the network itself, consuming bandwidth and other resources. Indeed, bandwidth is consumed whenever telemetry data 304 is sent to message bus 308 or from message bus 308 on to any of the recipients 312-316. In addition, the more telemetry data 304 there is, the more resources consumed by message bus 308.

Message Bus Subscription Management with Telemetry Inform Message

The techniques herein introduce a message bus subscription management function. In some aspects, the techniques herein leverage stateful counter monitoring and a telemetry inform channel that negotiates recommendations of data subscription information between telemetry enabled devices and a topic-based message bus. By letting the device inform downstream applications that a change in available data or event driven data has occurred, downstream applications can request subscription information particular to new event types or counters, rather than receiving all data from all devices.

Illustratively, the techniques described herein may be performed by hardware, software, and/or firmware, such as in accordance with the telemetry reporting process 248, which may include computer executable instructions executed by the processor 220 (or independent processor of interfaces 210), to perform functions relating to the techniques described herein.

Specifically, according to various embodiments, a device maintains a buffer of historical telemetry data of a particular type of telemetry. The device obtains new telemetry data of the particular type of telemetry. The device makes a state evaluation by comparing the new telemetry data to the buffer, to determine whether the new telemetry data is an outlier. The device sends a message indicative of the new telemetry data to a message bus for delivery to a recipient that is not subscribed to receive telemetry data of the particular type of telemetry, when the device determines that the new telemetry data is an outlier.

Figure 4:
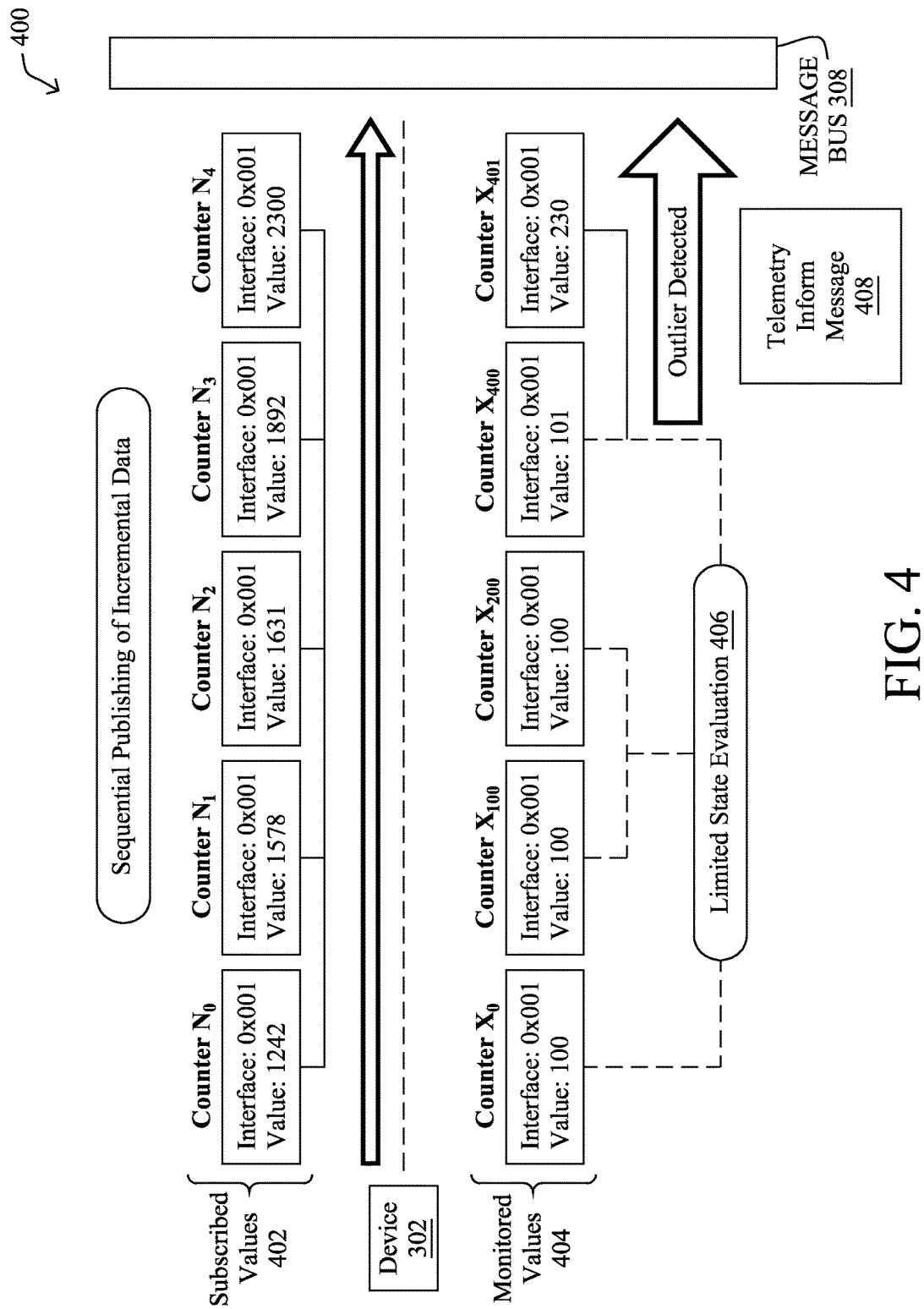
FIG. 4 illustrates an example of the sending of a telemetry inform message.

Operationally, the techniques herein propose a method to negotiate the level of streaming telemetry data exchanged between devices and message bus systems through the use of a "Telemetry Inform Message" (TIM) and service channel in message bus systems. FIG. 4 illustrates an example 400 of the sending of a TIM, according to various embodiments.

Continuing the example of FIG. 3, again assume that there is a device 302 that generates telemetry data that may be sent to message bus 308 for distribution to any subscribed recipients. Since enabling the subscription of all available streaming telemetry services on a device could lead to capacity problems, the techniques herein propose starting from an "everything off" approach. Under this approach, a default behavior for device 302 may be to not send telemetry data of a certain type to message bus 308 for publication, unless one or more conditions are first met. A negotiation mechanism is also introduced herein between the device 302 and message bus 308 whereby the two entities negotiate subscriptions, when these one or more conditions are met, such as the case when a telemetry value is an outlier from its historical values.

In various embodiments, the techniques herein may be performed by making a (limited) state evaluation 406 for unsubscribed types of telemetry. Rather than sending all telemetry data available, or repeat data that may not be useful, device 302 may utilize a limited state buffer that takes the form of a variation of a round robin database, to aggregate and average telemetry value over time. This buffer can be separated into a distinct "analytics plane," which separates out the function and processes required to make limited computations and to continually evaluate the state of the telemetry values. Evaluation of the real-time values of the telemetry values against statistical operators in the limited state buffer can provide an indication of significant change in the behavior of the telemetry data. An assumption is then made that unsubscribed recipients may be interested in this type of telemetry data, as it has suddenly become interesting.

By way of example, consider the case in which device 302 generates telemetry data comprising counter values for its interface 0x001. If a subscription already exists with message bus 308, device 302 may simply send the subscribed values 402 to message bus 308, sequentially. However, in various embodiments, device 302 may not send the values of this counter to message bus 308, by default. Instead, device 302 may monitor the values of this counter, denoted monitored values 404 in FIG. 4. In general, a "monitored" counter that is active, yet not subscribed to, may be continuously evaluated against the limited buffer of historical data. If there is a behavioral deviation, be it the change of state of an interface, or an extreme deviation from normal operating behavior, device 302 may send a telemetry inform message (TIM) 408 to message bus 308.

More specifically, using monitored values 404, device 302 may maintain a buffer of historical counter values for the interface, which may include up to a predefined maximum number of counter values. As additional counter values are generated, device 302 may also age out older values from its buffer, to cap the memory footprint of the buffer.

For each new counter value, device 302 may make state evaluation 406 by comparing the new counter value to the historical values in its buffer. For instance, as shown, assume that the historical counter values were 100, 100, 100, and 101, over time. However, now assume that the newest counter value suddenly jumps to a value of 230. In such a case, device 302 may determine that this new counter value is an outlier. In some embodiments, device 302 may do so leveraging a machine learning-based anomaly detector, such as an autoregressive integrated moving average (ARIMA)-based model, or other machine learning or statistical model configured to detect outlier values.

Since device 302 has determined that the new counter value for its interface is an outlier, it may send TIM 408 to message bus 308, indicating that the new counter value is an outlier and may be of interest. In various embodiments, TIM 408 may alert message bus 308 of the availability of new data and initiates the creation of a negotiation channel. This negotiation channel allows device 302 to relay information on the new or changed data source and gives message bus 308 the ability to decide whether it wants to start consuming data, or if the data is not of interest to downstream topics and applications.

For instance, assume that message bus 308 notifies NMS 316 from FIG. 3, which is not currently subscribed to the interface counter of device 302, of the outlier counter value indicated by TIM 408. In turn, NMS 316 may indicate that the counter value is of interest and would like to subscribe to the counter as a topic. When this occurs, message bus 308 may adjust the reporting of the counter value by device 302 to moving from a monitored state to a subscribed state. As a result, device 302 may start sequentially publishing the counter values to message bus 308 (e.g., as subscribed values 402).

Figure 5:
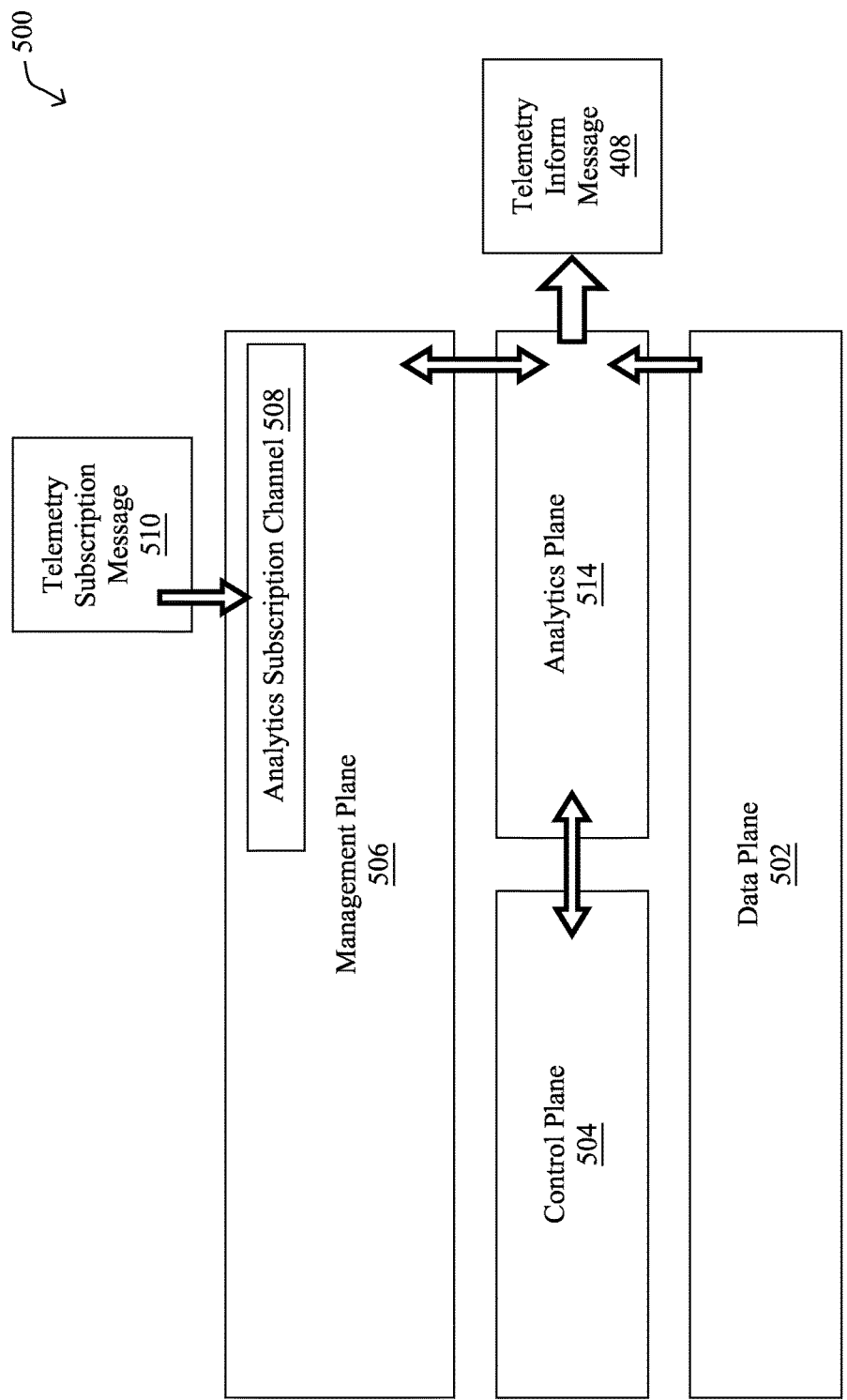
FIG. 5 illustrates an example of different planes of a network.

FIG. 5 illustrates an example 500 of different planes of a network, according to various embodiments. As shown, the techniques herein introduce an analytics plane 514 for the network that operates in conjunction with the other network planes: data plane 502, control plane 504, and management plane 506. Generally, speaking, 514 interacts with these other planes to extract telemetry data and process it with different statistical and/or machine learning techniques, to determine whether the current key performance indicator (KPI) is uncommon for the device and "interesting" for a potential subscriber.

Using an analytics subscription channel, users and downstream applications/services can request to be notified when certain events occur on different KPIs managed by the limited state evaluation process in the analytics plane, in some embodiments. When KPI values are triggered or reach a particular threshold, a TIM 408 is then sent, to advertise the potentially interesting data sources to eligible subscribers. In turn, if any of the potential subscribers wish to begin receiving these KPI values, a telemetry subscription message 510 may be returned and handled by analytics subscription channel 508. In doing so, the source device may be reconfigured to begin publishing the KPI of interest to the message bus for delivery to the end subscriber(s).

Figure 6:
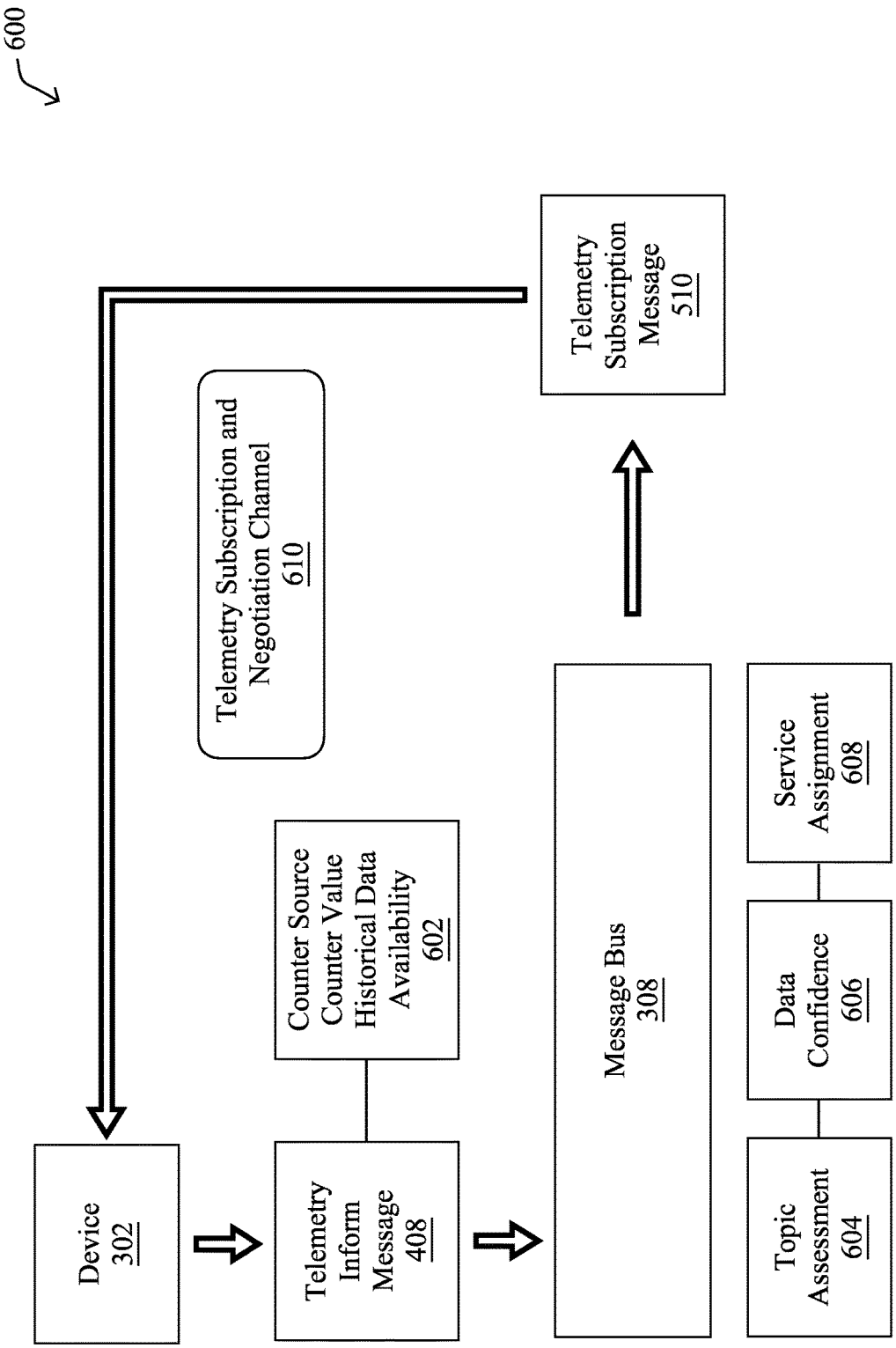
FIG. 6 illustrates an example of channel negotiation for a message bus.

FIG. 6 illustrates an example 600 of channel negotiation for a message bus, according to various embodiments. Continuing the previous examples, again assume that there is a device 302 that generates a certain type of telemetry data and sends a TIM 408 to message bus 308, when the value(s) of that telemetry are deemed outliers. More specifically, device 302 may decide to send TIM 408 to message bus 308 based on its local assessment 602, where it assesses the counter source, latest counter value(s), and available historical values.

In response to receiving TIM 408, message bus 308 may perform a topic assignment 604 for the type of telemetry indicated by TIM 408. For instance, such a topic may be "Interface 0x001 counter for device 302." In further embodiments, message bus 308 may make a data confidence assessment 606, where it determines whether there is a confidence level of applicability to downstream consumers through a series of validation checks and service compatibility. For instance, if a potential subscriber for the telemetry data is not configured to receive such information, message bus 308 may deem this subscriber as ineligible to subscribe to it. Conversely, if a potential subscriber is capable of consuming the type of telemetry data, message bus 308 may identify this entity as an eligible recipient. As part of data confidence assessment 606, message bus 308 may also determine whether a potential recipient is authorized the type of telemetry data. Indeed, there may be some subscribers of message bus 308 that are not allowed to access the particular type of telemetry indicated by TIM 408.

In various embodiments, message bus 308 may also make a service assignment 608, whereby message bus 308 determines whether the particular type of telemetry data from 302 should switch from being in a 'monitored' state to being in an actively streamed state. In some embodiments, message bus 308 may do so, automatically. For instance, message bus 308 may decide that the telemetry should be streamed immediately, based on its particular type, the amount of its deviation from its historical values, a predicted degree of interest on behalf of the potential recipients, etc. In other instances, message bus 308 may pass the information from TIM 408 to the eligible recipients, to determine their interest in receiving the telemetry.

Message bus 308 may then send a telemetry subscription message 510 via its telemetry subscription and negotiation channel 610 with device 302, to request that device 302 start publishing the telemetry indicated in TIM 408 to message bus 308. In doing so, device 302 may begin pushing its generated telemetry data values to message bus 308, which associates these values with the topic assigned as part of topic assignment 604. Thus, any subscribers to this topic may then receive the published values for further processing.

Figure 7:
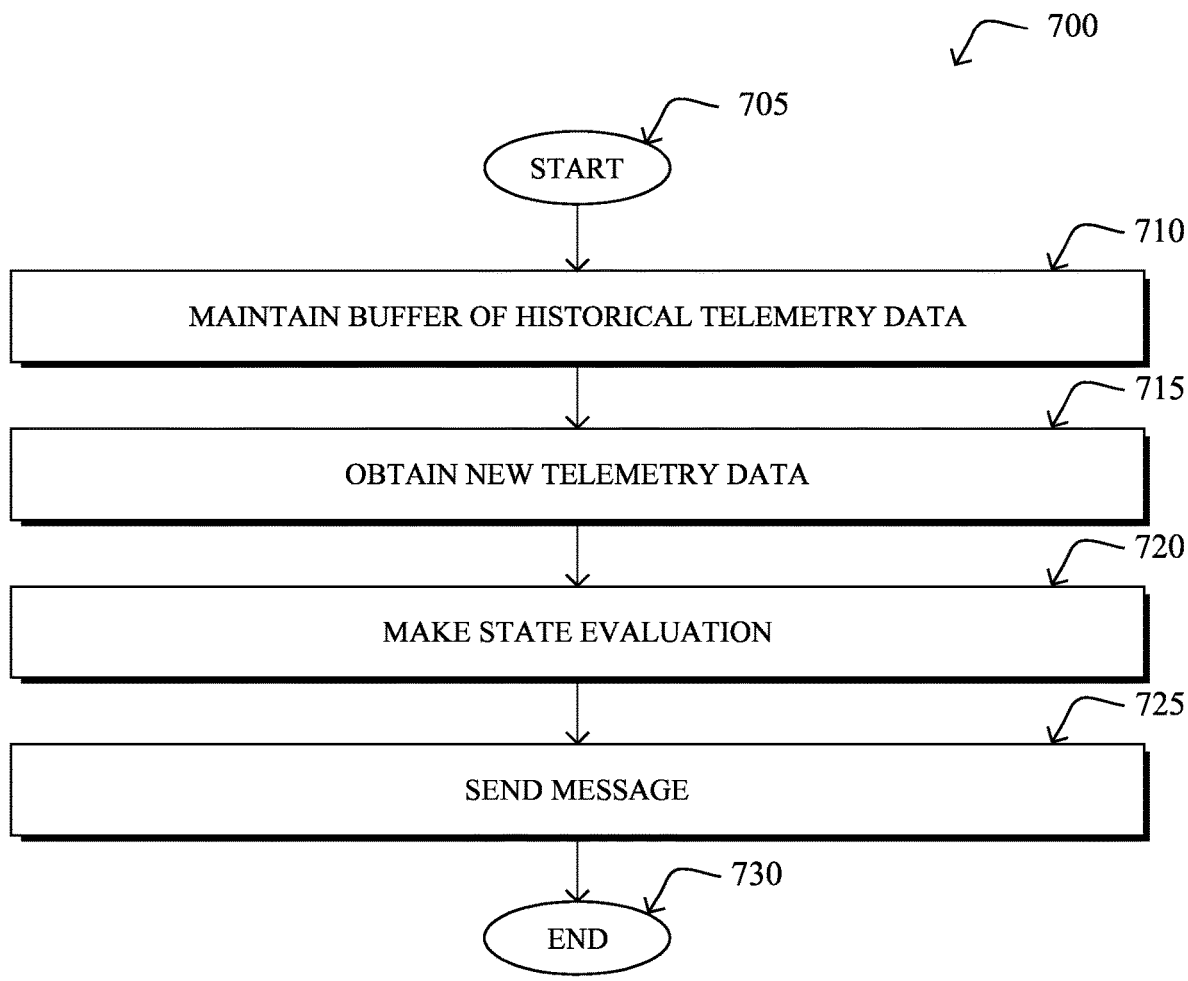
FIG. 7 illustrates an example simplified procedure for assessing the relevancy of telemetry data.

FIG. 7 illustrates an example simplified procedure for assessing the relevancy of telemetry data, in accordance with one or more embodiments described herein. For example, a non-generic, specifically configured device (e.g., device 200) may perform procedure 700 by executing stored instructions (e.g., telemetry reporting process 248). The procedure 700 may start at step 705, and continues to step 710, where, as described in greater detail above, the device may maintain a buffer of historical telemetry data of a particular type of telemetry. For instance, the type of telemetry may be a KPI for a networking device, a counter for an interface, or any other type of telemetry that may be collected in a network (e.g., sensor data, etc.). In some embodiments, the buffer may store up to a maximum number of telemetry data values/measurements of the particular type. To this end, the device may age out older telemetry values, as new ones are added to the buffer.

At step 715, as detailed above, the device may obtain new telemetry data of the particular type of telemetry. In various embodiments, the device may do so by receiving the new telemetry data from another device. In other embodiments, the device may itself be the source of the telemetry data, generating both the historical telemetry data and the new telemetry data.

At step 720, the device may make a state evaluation by comparing the new telemetry data to the buffer, to determine whether the new telemetry data is an outlier, as described in greater detail above. In general, this evaluation may be to discern whether the new telemetry data is consistent with the historical telemetry data or has deviated from it by a threshold amount. In some embodiments, the device may make the state evaluation in part by using the new telemetry data and the buffer of historical telemetry data as input to a machine learning-based anomaly detection model.

At step 725, as detailed above, the device may send a message indicative of the new telemetry data to a message bus for delivery to a recipient that is not subscribed to receive telemetry data of the particular type of telemetry, when the device determines that the new telemetry data is an outlier. Indeed, even though the recipient is not currently a subscriber to the type of telemetry, they may nonetheless wish to be alerted as to the telemetry due to the change in its behavior. In turn, the device may receive a subscription request for the particular type of telemetry, after sending the message. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques herein, therefore, help to reduce bandwidth and other resource consumption in a network by helping to reduce the amount of telemetry data streamed in the network. In some aspects, rather than requiring a recipient to explicitly subscribe to receive certain types of telemetry, the system may instead notify the recipient when the telemetry data becomes interesting in some manner.

While there have been shown and described illustrative embodiments that provide for message bus subscription management, it is to be understood that various other adaptations and modifications may be made within the spirit and scope of the embodiments herein. For example, while certain embodiments are described herein primarily with respect to certain types of telemetry, other forms of telemetry data could also be used, without deviating from the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device, a buffer of historical telemetry data of a particular type of telemetry;
   obtaining, by the device, new telemetry data of the particular type of telemetry;
   making, by the device, a state evaluation by comparing the new telemetry data to the buffer, to determine whether the new telemetry data is an outlier;
   sending, by the device, a message indicative of the new telemetry data to a message bus for delivery to a recipient that is not subscribed to receive telemetry data of the particular type of telemetry, when the device determines that the new telemetry data is an outlier, wherein the message bus assigns a subscribable topic to the particular type of telemetry; and
   receiving, at the device, a subscription request from the recipient for the particular type of telemetry, after sending the message.

2. The method as in claim 1, wherein the particular type of telemetry comprises a key performance indicator (KPI) for a networking device.

3. The method as in claim 1, wherein the particular type of telemetry comprises a counter for an interface.

4. The method as in claim 1, wherein the device makes the state evaluation in part by using the new telemetry data and the buffer of historical telemetry data as input to a machine learning-based anomaly detection model.

5. The method as in claim 1, wherein the buffer of historical telemetry data stores up to a maximum number of telemetry data values of the particular type of telemetry.

6. The method as in claim 5, wherein the buffer of historical telemetry data ages out older telemetry data values of the particular type of telemetry.

7. The method as in claim 1, wherein the recipient comprises a flow collector, a security information event management service, a log management service, or a network management system.

8. The method as in claim 1, further comprising:
   generating, by the device, the historical telemetry data and the new telemetry data.

9. An apparatus, comprising:
   a network interface to communicate with a computer network;
   a processor coupled to the network interface and configured to execute one or more processes; and
   a memory configured to store a process that is executed by the processor, the process when executed configured to:
   maintain a buffer of historical telemetry data of a particular type of telemetry;
   obtain new telemetry data of the particular type of telemetry;
   make a state evaluation by comparing the new telemetry data to the buffer, to determine whether the new telemetry data is an outlier;
   send a message indicative of the new telemetry data to a message bus for delivery to a recipient that is not subscribed to receive telemetry data of the particular type of telemetry, when the apparatus determines that the new telemetry data is an outlier wherein the message bus assigns a subscribable topic to the particular type of telemetry; and
   receive a subscription request from the recipient for the particular type of telemetry, after sending the message.

10. The apparatus as in claim 9, wherein the particular type of telemetry comprises a key performance indicator (KPI) for a networking device.

11. The apparatus as in claim 9, wherein the particular type of telemetry comprises a counter for an interface.

12. The apparatus as in claim 9, wherein the apparatus makes the state evaluation in part by using the new telemetry data and the buffer of historical telemetry data as input to a machine learning-based anomaly detection model.

13. The apparatus as in claim 9, wherein the buffer of historical telemetry data stores up to a maximum number of telemetry data values of the particular type of telemetry.

14. The apparatus as in claim 13, wherein the buffer of historical telemetry data ages out older telemetry data values of the particular type of telemetry.

15. The apparatus as in claim 9, wherein the recipient comprises a flow collector, a security information event management service, a log management service, or a network management system.

16. A tangible, non-transitory, computer-readable medium storing program instructions that cause a device to execute a process comprising:
   maintaining, by the device, a buffer of historical telemetry data of a particular type of telemetry;
   obtaining, by the device, new telemetry data of the particular type of telemetry;
   making, by the device, a state evaluation by comparing the new telemetry data to the buffer, to determine whether the new telemetry data is an outlier;
   sending, by the device, a message indicative of the new telemetry data to a message bus for delivery to a recipient that is not subscribed to receive telemetry data of the particular type of telemetry, when the device determines that the new telemetry data is an outlier, wherein the message bus assigns a subscribable topic to the particular type of telemetry; and receiving, at the device, a subscription request from the recipient for the particular type of telemetry, after sending the message.

* * * * *

UNITED STATES PATENT AND TRADEMARK OFFICE
CERTIFICATE OF CORRECTION

| | | |
|---|---|---|
| PATENT NO. | : 11,595,283 B2 | |
| APPLICATION NO. | : 17/385457 | |
| DATED | : February 28, 2023 | |
| INVENTOR(S) | : Derek Engi | |

It is certified that error appears in the above-identified patent and that said Letters Patent is hereby corrected as shown below:

In the Specification

Column 3, Line 8, please amend as shown:
generation" (3G)/"fourth generation" (4G)/"fifth generation In the Claims Column 12, Line 26, please amend as shown:
the new telemetry data is an outlier, wherein the Signed and Sealed this
Eleventh Day of April, 2023

Katherine Kelly Vidal
*Director of the United States Patent and Trademark Office*